United States Patent [19]

Birenbaum

[11] 4,384,729
[45] May 24, 1983

[54] INTERLOCKING DUAL PLANE GAPPED COMPRESSION RINGS

[76] Inventor: Benjamin Birenbaum, 59 Neptune Dr., Apt. #104, Toronto, Ontario, Canada

[21] Appl. No.: 265,621

[22] Filed: May 20, 1981

[51] Int. Cl.³ .............................. F16J 9/16; F16J 9/24
[52] U.S. Cl. .................................... 277/197; 277/193; 277/218
[58] Field of Search ............................... 277/216–222, 277/193, 197, 199

[56] References Cited

U.S. PATENT DOCUMENTS

| | | | |
|---|---|---|---|
| 1,151,265 | 8/1915 | Haggard | 277/197 X |
| 1,172,677 | 2/1916 | Davidson | 277/197 |
| 1,370,342 | 3/1921 | Miller | 277/197 |
| 1,476,657 | 12/1923 | Tawney | 277/197 |
| 2,486,928 | 11/1949 | Cole | 277/218 X |
| 2,757,057 | 7/1956 | Sanon | 277/197 |
| 2,900,213 | 8/1959 | Bruce | 277/197 |
| 3,949,997 | 4/1976 | Bergeron | 277/221 |
| 4,240,644 | 12/1980 | Busto | 277/197 X |

FOREIGN PATENT DOCUMENTS

| | | | |
|---|---|---|---|
| 907670 | 7/1945 | France | 277/193 |
| 636306 | 3/1962 | Italy | 277/193 |
| 335610 | 9/1930 | United Kingdom | 277/197 |
| 397782 | 8/1933 | United Kingdom | 277/197 |
| 436990 | 10/1935 | United Kingdom | 277/193 |

*Primary Examiner*—Robert S. Ward, Jr.

[57] ABSTRACT

A dual planar compression ring arrangement where first and second compression rings for fitting into a single groove of a piston coaxial with and abutting one another. The first ring has a flat surface provided with an axial projection for fitting into the gap of the second ring to prevent rotation of the ring gaps towards one another. The gap in the second ring is contoured to permit full closure of the second ring upon itself around the projection.

2 Claims, 5 Drawing Figures

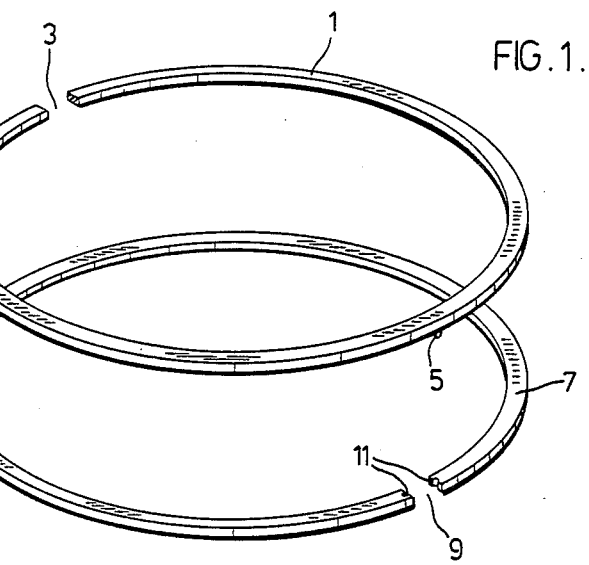
FIG.1.
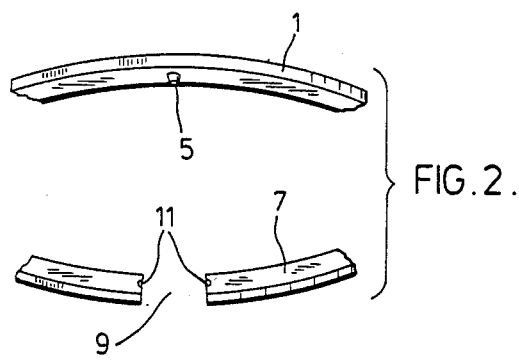
FIG.2.
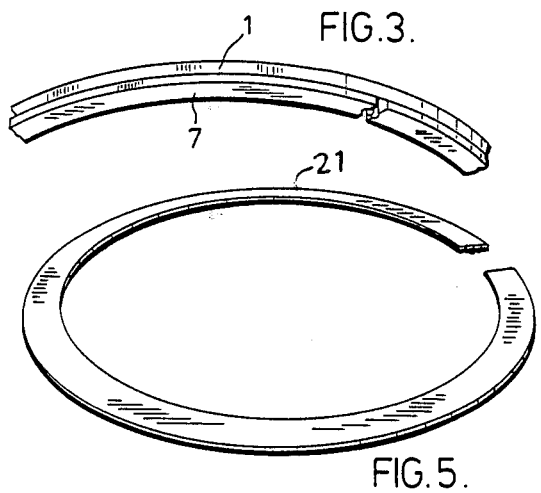
FIG.3.
FIG.5.
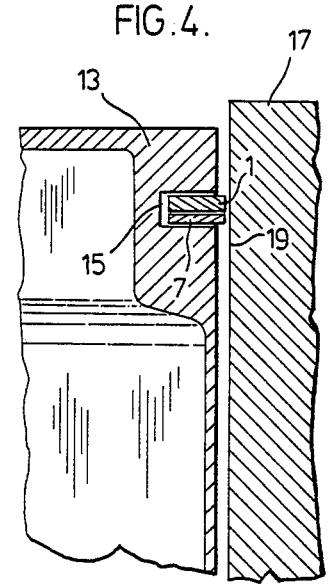
FIG.4.

INTERLOCKING DUAL PLANE GAPPED COMPRESSION RINGS

FIELD OF THE INVENTION

The present invention relates to a plane compression ring arrangement for use on a piston of an internal combustion engine, steam engine, gas compressor or the like. The arrangement comprises dual plane compression rings adapted to fit in a single groove on the piston body.

BACKGROUND OF THE INVENTION

There are presently available, two general types of piston compression rings. One type uses a plane compression ring and the other type uses a wedge-shaped ring. Both types use one ring per groove on the piston. The rings are gapped in a manner to maintain ring clearance with dimensional changes of the cylinder bore with changing engine temperatures.

According to these standard ring arrangements described above the compression and gases blow-by and leak through the ring gaps into the crank case. This problem increases as the cylinder bore increases with wear because the rings move out to the increased bore size such that the ring gaps are continually opening further the more the engine is used providing an increased blow-by area. The blow-by of the compressed gases affects the power output of the engine and increases fuel comsumption. In addition there is increased air pollution.

In an attempt to overcome the blow-by problem the piston is normally provided with anywhere from two to four single compression rings which are initially set up in assembly such that the ring gaps are away from one another. However, as the engine is used, the gaps generally tend to align with one another due to the pressure of the escaping gases through the gaps attempting to escape through as short a route as possible into the crank case of the engine.

A further problem which has been encountered in deisel engines is that the conventional plane rings tend to seize in the top piston groove so that the wedge rings mentioned above were brought in to overcome this problem. However the wedge rings present their own problems because as the cylinder bore wears, the rings gradually move out of the piston groove to the cylinder wall allowing the ring to move abruptly up and down following the piston stroke, further increasing wear on the groove. This up and down movement of the wedge shaped ring eventually leads to the characteristic breaking of the top ring.

SUMMARY OF THE PRESENT INVENTION

The present invention provides a dual plane compression ring arrangement for use on a piston adapted to overcome the blow-by problem as described above. The arrangement comprises first and second individually gapped plane compression rings for fitting in a single groove of the piston coaxial with and abutting one another. The first ring, which can either be used as the upper or the lower ring is provided with an axial projection remote from the gap in the first ring. The second ring is recessed at the gap in the second ring to receive the axial projection of the first ring to essentially eliminate rotation between the rings without effecting closure of the gap of the second ring. The arrangement is such that when the rings are fitted in the groove of the piston with the projection of the first ring received in the gap of the second ring, the gaps in the two rings are located and are maintained away from one another to provide an effective seal around the cylinder bore in which the piston reciprocates.

BRIEF DISCUSSION OF THE DRAWINGS

The above as well as other advantages and features of the present invention will be described in greater detail according to the preferred embodiments of the present invention wherein:

FIG. 1 is a perspective view looking down on two compression rings according a preferred embodiment of the present invention;

FIG. 2 is an enlarged section of the rings shown in FIG. 1 at the axial projection of the upper ring and the split of the lower ring;

FIG. 3 is a bottom perspective view showing the rings of FIG. 1 ready for assembly in a single piston groove;

FIG. 4 is a section through a piston in a cylinder showing the assembled rings of FIG. 3 in a piston groove; and, FIG. 5 is a perspective view of a spacer ring suitable for use with the compression ring arrangement of FIGS. 1 through 4.

DETAILED DESCRIPTION ACCORDING TO THE PREFERRED EMBODIMENTS OF THE PRESENT INVENTION

The two piston rings comprising upper ring 1 and lower ring 7 shown in FIG. 1 are adapted to fit in a single piston groove 15 of piston body 13 as shown in FIG. 4. Compression ring 1 is gapped at 3 while compression ring 7 is provided with a gap 9. These ring gaps allow the rings to open and close in accordance with the size of the cylinder bore regardless of the wear or temperature in the cylinder so that the rings effectively seal against the cylinder wall 19 of cylinder 17.

Upper ring 1 which as shown in FIG. 4 is of increased thickness relative to lower ring 7 for increased durability is provided with a downward axial projection 5 best shown in FIGS. 1 and 2. Projection 5 is located diametrically opposite gap 3 in ring 1. Ring 7 is on the other hand provided with small grooves 11 to either side of gap 9 in the lower ring. These grooves are rounded to loosely conform to the shape of the rounded axial projection on the upper ring while allowing the gap in the lower ring to close to the clearance specified during assembly.

In order to properly fit the rings into the piston groove they are turned with respect to one another to the FIG. 1 position whereby ring gaps 3 and 9 are located at 180 degrees to one another. When the rings are snapped into position on the piston the upper ring projection 5 is received in the lower ring gap 9 and locked in position by the piston groove as shown in FIG. 3. The engagement of the projection of the upper ring in the gap of the lower ring effectively prevents essentially all rotation between the two rings so that the ring gaps are constantly maintained away from one another without effecting closure of the lower ring. This provides an effective seal against gases blowing between the upper ring and the cylinder wall to the engine crank case while the lower ring provides a seal for the gap of the upper ring.

As will be appreciated the arrangement could easily be reversed whereby the projection is provided on the lower ring extending upwardly into the gap of the upper ring adapted to receive the projection. Furthermore the projection need not necessarily be diametrically opposite the gap in the ring on which the projection is provided as long as it is remote from the ring gap whereby when the projection is received in the gap of the other ring, the two ring gaps are located an effective sealing distance away from one another.

Unlike prior art arrangements the dual compression rings of the present invention are not generally subject to either seizing or excessive movement in the piston groove. Firstly, each of the rings according to the present invention is thinner and of increased flexibility in comparison to single prior art rings. This increased flexibility allows for better sealing of the two rings in the cylinder bore because they can more easily move to, and accommodate dimensional changes in the cylinder bore. Furthermore, the two rings in one groove allow more clearance in the groove than that provided with a single plane ring.

As a result of its better sealing, the dual ring arrangement enables the use of fewer groove and ring sealing locations on the piston over prior art single rings. In fact, according to the present invention, it is preferable to use only one such sealing location as shown in FIG. 4 rather than multiple groove and ring locations found using conventional single compression rings.

Secondly the dual compression ring arrangement of the present invention is not subject to the up and down movement of wedge shaped rings used in an attempt to overcome ring seizure. This up and down movement does not occur according to the present invention since the two rings placed in one groove are flat and therefore of consistent thickness so that there is always a constant minimal clearance of the rings in the piston groove.

The spacer ring 21 shown in FIG. 5 which can be used with the dual ring arrangement is springy due to the dishing effect provided by the conical shaping of the ring. This spacer ring flexibly holds the dual compression rings against axial movement in the piston groove for a ring job on an engine where the cylinder bores, although slightly ovally worn, are reusable. Such ovally worn cylinder bores generally wear excessively on the piston grooves following the up and down stroke of the pistons however the springy ring spacers will flexibly hold the rings in the groove to substantially eliminate the wear.

Although various preferred embodiments of the invention have been described herein in detail, it will be appreciated by those skilled in the art that variations may be made thereto without departing from the spirit of the invention or the scope of the appended claims.

The embodiments of the invention in which an exclusive property or privilege is claimed are defined as follows:

1. A dual compression ring arrangement for use on a piston, said compression ring arrangement comprising first and second plane compression rings for fitting into a single groove of the piston coaxial with and abutting one another, each of said rings being of substantially constant radial width and axial thickness with mating flat surfaces and each ring having a ring gap with the first ring having an axial projection extending from the flat surface thereof remote from the gap in the first ring for fitting into the gap of the second ring to essentially eliminate rotation between the rings with the ring gaps being located and maintained away from one another, said second ring being recessed to at least one side of the second ring gap to matingly receive said axial projection which is of a diameter less than the radial width of said first ring for enabling complete closure of said second ring upon itself around said axial projection.

2. A dual compression ring as claimed in claim 1, wherein said axial projection is substantially circular in section and said second ring gap is provided to either side with a semicircular groove less than the radial width of said second ring for matingly receiving and fitting around said axial projection.

* * * * *